United States Patent [19]

Venkataswamy et al.

[11] Patent Number: 5,777,033

[45] Date of Patent: *Jul. 7, 1998

[54] CO-CURED RUBBER-THERMOPLASTIC ELASTOMER COMPOSITIONS

[75] Inventors: Krishna Venkataswamy; Sabet Abdou-Sabet; Raman Patel, all of Akron, Ohio; Jacques Horrion, Tilff, Belgium

[73] Assignee: Advanced Elastomer Systems, L.P., Akron, Ohio

[ * ] Notice: The term of this patent shall not extend beyond the expiration date of Pat. No. 5,589,544.

[21] Appl. No.: 686,798

[22] Filed: Jul. 26, 1996

[51] Int. Cl.$^6$ .............. C08F 8/30; C08L 31/00; C08L 77/00
[52] U.S. Cl. .............. 525/182; 525/66; 525/183
[58] Field of Search .............. 525/182, 183, 525/66

[56] References Cited

U.S. PATENT DOCUMENTS

| | | | |
|---|---|---|---|
| 4,348,502 | 9/1982 | Coran et al. | 525/187 |
| 4,474,927 | 10/1984 | Novak | 525/66 |
| 4,694,042 | 9/1987 | McKee et al. | 525/66 |
| 4,871,810 | 10/1989 | Saltman | 525/137 |
| 4,996,264 | 2/1991 | Aonuma et al. | 525/179 |
| 5,003,003 | 3/1991 | Olivier | 525/66 |
| 5,180,777 | 1/1993 | Padwa et al. | 252/66 |
| 5,231,138 | 7/1993 | Aonuma et al. | 525/179 |
| 5,300,573 | 4/1994 | Patel | 525/109 |
| 5,574,105 | 11/1996 | Venkataswamy | 525/179 |
| 5,589,544 | 12/1996 | Horrion | 525/176 |
| 5,591,798 | 1/1997 | Patel | 524/514 |

FOREIGN PATENT DOCUMENTS 0 337 977 A2  10/1989  European Pat. Off. .

*Primary Examiner*—Randy Gulakowski
*Attorney, Agent, or Firm*—Daniel J. Hudak; Laura F. Shunk; William A. Skinner

[57] ABSTRACT

A thermoplastic elastomer composition has a plastic phase or matrix of an engineering thermoplastic such as a polyamide and a crosslinked phase of cured acrylic rubbers. The rubbers contain at least two functionalized acrylic rubbers wherein the functional group such as a carboxyl, an epoxy, or a hydroxyl can be the same or different. The curing agents generally react via covalent bonding with the reactive functional groups of the rubbers. The composition can be dynamically vulcanized and when one of the rubbers is a terpolymer of ethylene-alkyl acrylate-unsaturated carboxylic acid, the composition has a single low temperature brittle point.

13 Claims, No Drawings

CO-CURED RUBBER-THERMOPLASTIC ELASTOMER COMPOSITIONS

FIELD OF THE INVENTION

The present invention relates to thermoplastic elastomer compositions made utilizing at least two functionalized acrylic rubbers which are crosslinked through the use of a curing agent. The thermoplastic is generally a polyamide and the two or more functionalized acrylic rubbers can be dynamically vulcanized in the presence thereof. The composition has a single low temperature brittle point and low oil swell.

BACKGROUND OF THE INVENTION

Thermoplastic elastomers are materials which exhibit both thermoplastic and elastomeric properties, i.e., the materials can be processed as thermoplastics but have physical properties common to elastomers. Shaped articles can be formed from thermoplastic elastomers by extrusion, injection molding or compression molding without the time-consuming cure step required with conventional vulcanizates. Further, thermoplastic elastomers can be reprocessed without the need for reclaiming and, in addition, many thermoplastic elastomers can be thermally welded.

European patent application 337,977 to Patel relates to thermoplastic elastomer compositions comprising a blend of polyamide resin and a covalently crosslinked acrylate rubber.

SUMMARY OF THE INVENTION

A blend of at least two functionalized acrylic rubbers are typically covalently cured in the presence of a curing agent and an engineering thermoplastic. One of the functionalized acrylic rubbers desirably is a terpolymer derived from ethylene, alkyl acrylate, and unsaturated carboxylic acid monomers. The functional groups of the two or more acrylates can be the same or different and upon cure, the composition unexpectedly only has a single low temperature brittle point such as minus 20° C. or lower. The thermodynamic elastomers are generally well suited for commercial applications. As used herein, the term "elastomeric" refers to thermoplastic compositions which exhibit rubber-like elasticity.

DETAILED DESCRIPTION OF THE INVENTION

The thermoplastic elastomer compositions of the present invention generally contain a plastic phase or matrix of a polyamide which is compatible with the two or more functionalized acrylic rubber components.

A suitable thermoplastic polyamide resin comprises thermoplastic crystalline or amorphous high molecular weight solid polymers including homopolymers, copolymers and terpolymers having recurring amide units within the polymer chain. Both fiber forming and molding grade nylons are suitable polyamide resins. Commercially available nylons having a softening point or melting point above 100° C. may be advantageously used in the practice of this invention and nylons having a softening or melting point between 160° C. and 280° C. are preferred. Examples of suitable polyamides are polylactams such as NYLON 6, polypropiolactam (NYLON 3), polyenantholactam (NYLON 7), polycapryllactam (NYLON 8), polylaurylactam (NYLON 12), and the like; homopolymers of amino acids such as polyaminoundecanoic acid (NYLON 11); polypyrrolidinone (NYLON 4); copolyamides of dicarboxylic acid and diamine such as NYLON 6,6, polytetramethyleneadipamide (NYLON 4,6), polytetramethyleneoxalamide (NYLON 4,2), polyhexamethyleneazelamide (NYLON 6,9), polyhexamethylenesebacamide (NYLON 6,10), polyhexamethyleneisophthalamide (NYLON 6,1), polyhexamethylenedodecanoic acid (NYLON 6,12) and the like; aromatic and partially aromatic polyamides; copolyamides such as of caprolactam and hexamethyleneadipamide (NYLON 6/6,6), or a terpolyamide, e.g., NYLON 6/6,6/6,10; block copolymers such as polyether polyamides; or mixtures thereof. Additional examples of suitable polyamides are described in the Encyclopedia of Polymer Science and Technology, Second Edition, Vol. 11, pages 315–476, incorporated herein by reference. Preferred polyamides employed in this invention are NYLON 6, NYLON 11, NYLON 12, NYLON 6,6, NYLON 6,9, NYLON 6,10, and NYLON 6/6,6. The polyamides generally have a number average molecular weight of from about 10,000 to about 50,000, and desirably from about 30,000 to about 40,0000. The amount of the polyamide is generally from about 25 to about 100, desirably from about 30 to about 90, and preferably from about 35 to about 75 parts by weight per 100 parts by weight of total acrylic rubbers.

The at least two functionalized acrylic rubber components are generally compatible with each other and also with the polyamide. Excluded from the present invention or substantially free thereof (i.e., less than 5%, less than 3%; less than 1%, and preferably nil % by weight based upon 100 parts by weight of the total acrylic rubbers) are nitrile groups, e.g., acrylonitrile containing rubbers such as nitrile rubbers. The two or more functionalized acrylic rubber components can be derived from an alkyl acrylate wherein the alkyl portion has from 1 to 10 carbon atoms with from 1 to 3 carbon atoms being desired. Specific examples include polymers of ethyl acrylate, butyl acrylate, ethyl-hexyl acrylate, and the like. Other suitable acrylic rubbers include copolymers of ethylene and the above noted alkyl acrylates wherein the amount of ethylene is desirably high, e.g., from about 10 to about 90 mole percent, desirably from about 30 to about 70 mole percent, and preferably from about 40 to about 60 mole percent of ethylene repeat groups based upon the total number of moles of ethylene and acrylate repeat groups in the copolymer, so as to produce a rubber having polar and non-polar portions.

The functional group of the two or more acrylic rubbers can be an acid, i.e., carboxyl group, an epoxy group, a hydroxy group, an ester group, and the like. The two or more rubbers can have different functional groups or they can be the same functional group. Such functionalized acrylic rubber components are formed by utilizing various comonomers during polymerization of the above noted acrylic polymers. An ester group can be added by utilizing an ester monomer such as the hemi ester of maleic anhydride. Suitable comonomers for adding hydroxyl groups include unsaturated alcohols having from about 2 to about 20 and desirably from 2 to about 10 carbon atoms. A specific example of a hydroxy functionalized acrylic rubber is Hytemp 4404 from Nippon-Zeon. To add pendent epoxy groups, suitable comonomers include unsaturated oxiranes such as oxirane acrylates wherein the oxirane group can contain from about 3 to about 10 carbon atoms and wherein the ester group of the acrylate is an alkyl having from 1 to 10 carbon atoms with a specific example being glycidyl acrylate. Another group of unsaturated oxiranes are the various oxirane alkenyl ethers wherein the oxirane group can have from about 3 to about 10 carbon atoms and the alkenyl group can also have from about 3 to about 10 carbon atoms with a specific example being allyl glycidyl ether. Examples of epoxy functionalized acrylic rubbers include Acrylate AR-53 and Acrylate AR-31 from Nippon-Zeon, and the like. To add pendent carboxylic acid groups, suitable comonomers include unsaturated acids having from 2 to about 15 carbon atoms and desirably from 2 to 10 carbon atoms. Examples of acid functionalized acrylic rubbers include terpolymers of ethylene-acrylate-carboxylic acids such as Vamac G from DuPont, and various carboxyl functional acrylates sold by Nippon-Zeon, and the like. The amount of the functional groups within any acrylic polymer can be up to about 10 mole percent, desirably from about 0.25 to about 6 mole percent, and preferably from about 0.5 to about 4 mole percent of the polymer, that is, of the total repeat groups therein.

Unexpectedly, it has been found that when an ethylene-alkyl acrylate-carboxylic acid terpolymer is utilized, the two or more acrylic rubber blends yield only one, i.e., a single, low temperature brittle point (LTB) and imparts good low temperature properties to the thermoplastic elastomer. The single LTB is generally minus 20° C. or lower, desirably minus 30° C. or lower, and preferably minus 40° C. or lower according to ASTM test No. D-746. Moreover, such terpolymer blends have good oil resistance, that is, low oil swell. The oil swell is generally from about 5 to about 30 or 40 and desirably from about 5 to about 15, 20, or 25 according to ASTM D-471 (125° C./70 hrs. % using ASTM Reference Oil #3). The oil swell values are at least 10 percent, desirably at least 20 or 30 percent, and preferably at least 40 or 50 percent lower than the oil swell value of only the acrylic terpolymer. The combination of the single low temperature brittle point along with the low oil swell values is highly desirably inasmuch as the thermoplastic elastomer compositions can be utilized in end products which are commercially desirable. For example, various seals, gaskets, etc., desirably have low oil swell values, for example, 40 or less, as well as a single low temperature brittle point, i.e., minus 20° C. or less. Especially desirable are such end products which have a single low temperature brittle point of minus 40° C. or less since the same can be utilized in cold climates.

The utilization of a terpolymer as one of the functionalized acrylic rubber components is thus highly preferred. Such terpolymers generally contain from about 35 to about 80 mole percent and desirably from about 45 to about 55 mole percent of ethylene repeat groups, generally from about 0.5 to about 10 mole percent and desirably from about 2 to about 8 mole percent of acid repeat groups, and generally from about 10 to about 60 mole percent and desirably from about 37 to about 50 mole percent of alkyl acrylate repeat groups based upon the total number of repeat groups in the terpolymer. The acid repeat groups are generally derived from acrylic acid or methacrylic acid. A specific commercially available compound such as Vamac G. Vamac LS, etc., manufactured by DuPont, which generally has about 50 mole percent ethylene, about 45 mole percent of methyl acrylate, and about 5 mole percent of acrylic acid. The amount of the terpolymer is generally essential to obtaining the highly desired properties of a single low temperature brittle point and good oil swell values. Accordingly, an amount of from about 25 to about 75, desirably from about 40 to about 60, and preferably from about 45 to about 55 parts by weight based upon 100 total parts by weight of all acrylic rubbers.

An important aspect of the present invention is the utilization of an effective amount of one or more curing agents (i.e., co-cure of the functionalized acrylic rubbers) to obtain suitable thermoplastic elastomeric properties. Such effective amounts generally result in a degree of cure of at least about 60 or 80 percent, desirably at least about 85 percent, and preferably at least about 90 percent, 95 percent, and even 100 percent, i.e., complete cure. The degree of cure is readily determined by the amount of undissolved acrylic rubber in toluene at 20° C. Suitable crosslinking agents cure the two or more functionalized acrylate rubbers generally through covalent bonding with the reactive functional groups. According to the concepts of the present invention, it is generally important to utilize nitrogen-containing crosslinking agents such as amines and preferably compounds containing two nitrogen crosslinking agents such as diamines. Examples of suitable crosslinking agents include various maleimides, various diisocyanates such as toluene diisocyanate, various isocyanate terminated polyester prepolymers, and various polyamines such as methylene dianiline. Additionally, various epoxides such as the diglycidyl ether of bisphenol-A, etc., can be utilized.

A highly preferred curing agent are the amine terminated polyethers. A specific class of such amines can be represented by the formula

H₂N—Alkylene—(—O—Alkylene—)ₙNH₂ (Formula 1)

wherein n is an integer from about 2 to about 100, desirably from about 2 to about 70 and preferably from about 2 to about 5, and wherein each "Alkylene," independently, has from 2 to about 10 carbon atoms with 2 carbon atoms, that is, ethylene, or 3 carbon atoms, that is, propylene, being preferred. The "Alkylene" group can be branched or straight. Specific examples of such amine terminated polyethers include the Jeffamine D-Series produced by Texaco, and have the formula

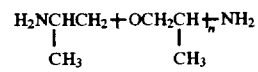

The various types of available Jeffamine D-Series products include the following:

| Product | n | Approx. Mo. Wt. |
| --- | --- | --- |
| Jeffamine D-230 | 2–3 | 230 |
| Jeffamine D-400 | 5–6 | 400 |
| Jeffamine D-2000 | 33 | 2000 |
| Jeffamine D-4000 | 68 | 4000 |

Other types of amine terminated polyethers suitable for use in the present invention are represented by the formula

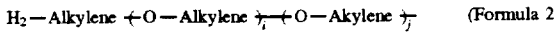

H₂—Alkylene +O—Alkylene )ᵢ+O—Akylene )ⱼ (Formula 2)

+O—Alkylene )ₖNH₂ wherein each "Alkylene," independently, is set forth above, and wherein i plus k is an integer of from about 2 to 25, desirably from about 2 to about 10 and preferably from about 2 to about 5. The number of repeat units represented by j is an integer of from about 1 to about 200, desirably from about 2 to about 150, and preferably from about 2 to about 10. Examples of such suitable polyethers include the Jeffamine ED-Series produced by Texaco, and have the formula

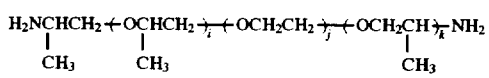

Examples of such specific Jeffamine ED-Series polymers include the following:

| Product | j | i + k | Approx. Mol. Wt. |
| --- | --- | --- | --- |
| Jeffamine ED-600 | 8.5 | 2.5 | 600 |
| Jeffamine ED-900 | 15.5 | 2.5 | 900 |
| Jeffamine ED-2001 | 40.5 | 2.5 | 2000 |
| Jeffamine ED-4000 | 86.0 | 2.5 | 4000 |
| Jeffamine ED-6000 | 131.5 | 2.5 | 6000 |

Still another type of suitable amine terminated polyethers which can be utilized in the present invention are those generally represented by the formula

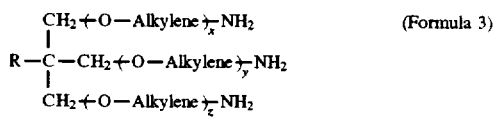
(Formula 3)

wherein each "Alkylene," independently, is as set forth above, that is, has from 2 to about 10 carbon atoms therein with 2 or 3 carbon atoms being preferred. The total number of x+y+z integers is from about 2 to about 100, desirably from about 2 to about 10 and preferably from about S to about 10. R is hydrogen or an aliphatic group with a desirable aliphatic group being an alkyl. When R is an alkyl it has from about 1 to about 5 carbon atoms with 1 or 2 carbon atoms being preferred. Examples of such suitable polyethers include the Jeffamine T-Series produced by Texaco, and have the formula

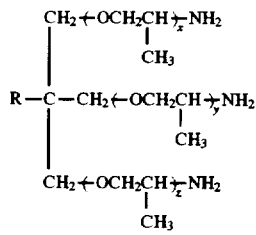

Examples of such specific Jeffamine T-Series include the following:

| Product | Approx. Value x + y + z | Approx. Mo. Wt. |
| --- | --- | --- |
| Jeffamine T-403 | 5–6 | 440 |
| Jeffamine T-3000 | 50 | 3000 |
| Jeffamine T-5000 | 85 | 5000 |

Another preferred class of curing agents are the various diamines, for example, various diamine carbamates. Examples of such curing agents include hexamethylene diamine carbamate such as Diak NBR 1 manufactured by Dupont.

The amount of the curing agents generally range from about 0.5 to about 12 parts by weight and desirably from about 1 to about 10, and often from about 3 to about 5 parts by weight per 100 parts by weight of the total of the two or more functionalized acrylic rubbers. When the functionalized rubbers have different functional groups thereon, some self-curing of the rubber occurs so that lesser amounts of the curing agent is required such as from about 1 to about 4 parts by weight.

Optionally, in association with curing agents, accelerators can be utilized to decrease the cure time of the two or more functionalized acrylic rubbers. Suitable accelerators include various salts of fatty acids that do not crosslink the functionalized rubber compounds. Often such compounds also serve as lubricants. The fatty acid salts generally have from 12 or 14 to 20 or 25 carbon atoms. Suitable cations include the alkaline as well as the alkaline earth metals, that is, Groups 1 and 2 of the Periodic Table, as well as the various transitional metals, for example, Groups 11 and 12 of the Periodic Table. Specific examples of accelerators include the sodium, potassium, magnesium, calcium, zinc, etc. salts of fatty acids such as palmitic acid, stearic acid, oleic acid, and the like, and mixtures thereof, with potassium stearate and magnesium stearate being preferred. The amount of the accelerators is small and can vary up to 10 parts by weight and desirably from about 0.1 to about 4 or 5 parts by weight per 100 parts by weight and oftentimes is from about 0.5 to about 1.5 parts by weight of all of the functionalized acrylic rubbers.

The compositions of the present invention can also contain various additives in conventional or suitable amounts. Such additives include various antioxidants, various ultraviolet light stabilizers such as various hindered amines, various processing aids, various colorants or pigments such as titanium dioxide, various reinforcing agents or fillers such as clay, silica, carbon black, talc, zinc oxide, and the like, various flame retardants, and various plasticizers such as the nonreactive sulfonamides and trimellitates, as well as the various phthalates, e.g., dioctyl phthalate.

The co-curing thermoplastic rubber compositions of the present invention desirably are cured via dynamic vulcanization. Dynamic vulcanization means vulcanizing the acrylate rubber of the composition of the present invention under high shear at cure temperatures. As a result, the rubber is generally crosslinked while being blended with a thermoplastic nylon polymer. The rubber can thus be simultaneously crosslinked and dispersed as fine particles of a "microgel" within the thermoplastic, e.g., polyamide, matrix, or form a crosslinked co-continuous phase with the plastic phase, or a combination thereof. Sources of high shear include Brabender mixers, Banbury mixers, extruders including twin screw extruders, and the like. A unique characteristic of the composition of the present invention is that while the elastomer rubber portion is crosslinked, the compositions nevertheless can be processed and reprocessed by conventional thermoplastic processing techniques and equipment such as extrusion, injection molding, compression molding and the like. An advantage of the thermoplastic elastomers of the present invention is that flashing, scrap, etc., can be salvaged and reprocessed. However, the two or more acrylic polymers are not phase separated, e.g., do not contain an inner phase and an outer phase which outer phase may or may not contain a graft linking monomer. That is, the invention is substantially free of such geometric (e.g., outer shell-inner core) acrylic compounds (i.e., less than 5%, less than 3%, less than 1% by weight, and preferably contain no such compounds per 100 parts by weight of all acrylic rubbers).

The exact method of dynamic vulcanization can vary, but generally the co-curing acrylic rubber and functionalized rubber components, the various accelerators, and the thermoplastic are added to a high shear mixing device such as a Brabender and the composition heated to a temperature above the melting point of the thermoplastic and mixed. The mixing temperature is generally from about 180° C. to about 260° C., and desirably from about 220° C. to about 250° C. The composition is mixed until the torque curve levels off (substantial curing) at which time the composition is mixed for an additional short period of time, for example, about 2 minutes. After mixing and curing, the thermoplastic elastomer compositions were removed from the Brabender mixer and cold pressed into a pancake and subsequently compression molded into plaques for testing.

Suitable uses of the thermoplastic elastomers of the present invention include molded, extruded or shaped articles useful as vehicle (for example, automotive) parts such as seals, tubings, hoses, gaskets, diaphragms, bellows, and the like.

The invention will be better understood by reference to the following examples which serve to illustrate but not to limit the scope of the present invention.

EXAMPLES

Blends of various nylon with two acid functionalized acrylic rubbers, one of which is a terpolymer of ethylene-alkyl acrylate-carboxylic acid monomers, were prepared and cured. The recipe for such compounds along with the physical properties thereof are set forth in Table I wherein Examples 1, 3, 6 and 7 were controls.

TABLE I

NYLON 6/ACRYLIC RUBBER/VAMAC

| (Parts by Weight) | 1 Control | 2 | 3 Control | 4 | 5 | 6 Control | 7 Control |
|---|---|---|---|---|---|---|---|
| Polymers | | | | | | | |
| Capron 8200[1] | 40 | 40 | 40 | 40 | 40 | 40 | 40 |
| Nipol AR90-130A[2] | 60 | 30 | 60 | 30 | 30 | 60 | |
| Vamac[3] | | 30 | | 30 | 30 | | 60 |
| Lica 44[4] (phr) | | | | | 1 | 1 | 1 |
| Jeffamine T403[5] (phr) | 2 | 2 | | | | | |
| Jeffamine D400[6] (phr) | | | 1.5 | 1.5 | | | |
| Mechanical Properties | | | | | | | |
| Hardness (5s.Sh D) | 46 | 42 | 48 | 41 | 44 | 47 | 42 |
| Tensile Strength at Break (MPa) | 24.4 | 22.3 | 22.6 | 17.8 | 22.8 | 22.5 | 24.0 |
| 100% Modulus (MPa) | 15.3 | 14.5 | 15.2 | 12.6 | 14.2 | 14.7 | 12.9 |
| Elongation at Break (%) | 229 | 215 | 253 | 237 | 249 | 251 | 281 |
| Compression Set (100C/22 Hrs) | 61 | 55 | 63 | 72 | 63 | 74 | 56 |
| Compression Set (125C/22 Hrs) | 69 | 61 | 90 | 87 | 88 | 88 | 84 |
| Oil Swell Nbr 3 (70C/168 Hrs) | 0.3 | 7 | 1 | 8 | 6 | 0 | 14 |
| Oil Swell Nbr 3 (150C/70 Hrs) | 4 | 18 | 6 | 21 | 18 | 5 | 27 |
| −40C LTB | F | P | F | P | P | F | P |

[1] Nylon 6, produced by Allied Signal.
[2] An experimental acrylic rubber produced by Nippon Zeon.
[3] A carboxylic acid-ethylene-methacrylic terpolymer produced by DuPont.
[4] Alkoxy titanate produced by Kenrich Petrochemical Co.
[5] Jeffamine T403 produced by Angus.
[6] Jeffamine D400 produced by Angus.

As apparent from Table I, when a terpolymer was utilized with another acrylate rubber, a single low temperature brittle point of at least −40° C. or below was achieved, i.e., Examples 2, 4, and 5. When the terpolymer was utilized by itself as an Example 7, although a low temperature brittle point was achieved, the oil swell, i.e., 27, was too high for suitable practical applications. In contrast, Examples 2, 4, and 5 contained suitable oil swell values. When only one functionalized acrylic rubber was utilized, which was not a terpolymer, i.e., Examples 1, 3 and 6, non-suitable low temperature brittle values were obtained. This data thus indicates that the utilization of a second acrylic copolymer in combination with the ethylene-carboxylic acid-alkyl acrylate was necessary to achieve good commercial low temperature brittle point properties.

The above compositions were prepared utilizing a Brabender mixer. The indicated functionalized acrylic rubber along with the terpolymer and the additives were masticated and melt-mixed with the Nylon 6 subsequently added. Once the thermoplastic nylon melted, the curing agents were added and mixed until the torque curve levelled off. Mixing was then continued for another one or two minutes.

The dynamic vulcanizates were pressed into a pancake and compression molded into plaques. Various physical tests were conducted and the properties thereof are set forth on the bottom of Table I. The 100 percent modulus is the tensile modulus at 100 percent elongation. The elongation is reported as a percent of the original length. Oil swell is determined in accordance with ASTM procedure D 471 and is the measured increase in specimen mass after emersion in hot oil expressed as a percentage of the original mass. The low temperature brittle point at minus 40° C. was in accordance with ASTM Test D746.

TABLE II

NYLON 6/ACRYLIC RUBBER/VAMAC

| (Parts by Weight) | 8 Control | 9 | 10 | 11 | 12 Control |
|---|---|---|---|---|---|
| Polymers | | | | | |
| Capron 8202[1] | 40 | 40 | 40 | 40 | 40 |
| Vamac G[2] | | 15 | 30 | 45 | 60 |
| Hytemp 405[3] | 60 | 45 | 30 | 15 | |
| Diak Nbr 1[4] (phr) | 2 | 2 | 2 | 2 | 2 |
| Properties | | | | | |
| Hardness (5s.Sh.A) | 93 | 93 | 91 | 90 | 86 |
| Tensile Strength at Break (MPa) | 18.0 | 22.0 | 23.7 | 26.1 | 20.8 |
| 100% Modulus (MPa) | 15.3 | 17.0 | 17.0 | 17.1 | 12.1 |
| Elongation at Break (%) | 149 | 162 | 172 | 193 | 240 |
| Compression Set (150C/70 Hrs)(%) | 100 | 93 | 81 | 77 | 78 |
| Compression Set (150C/70 Hrs)(%) | 85 | 75 | 64 | 54 | 49 |
| Oil Swell Nbr 3 (125C/70 Hrs)(%) | 4 | 8 | 12 | 18 | 20 |

[1] Nylon 6 from Allied Signal.
[2] A carboxylic acid-ethylene-methacrylic terpolymer produced by DuPont.
[3] A hydroxyl functionalized acrylate from BFGoodrich.
[4] Hexamethylene diamine carbamate from Dupont.

The above compositions were prepared in a manner as set forth with regard to the compounds set forth in Table I. The dynamic vulcanizates were pressed and molded into plaques and various physical tests were conducted. The properties of the tests are also set forth in Table II. As apparent from Table II, Examples 9–11 gave good low oil swell values. Moreover, Examples 9–11 only had a single low temperature brittle point although two different types of acrylate rubbers were utilized.

While in accordance with the Patent Statutes, the best mode and preferred embodiment has been set forth, the scope of the invention is not limited thereto, but rather by the scope of the attached claims.

What is claimed is:

1. A thermoplastic elastomer composition, comprising: a polyamide thermoplastic phase and a crosslinked rubber phase, said rubber phase comprising at least two dynamically vulcanized functional acrylic rubbers one of which is a terpolymer, said terpolymer being an ethylene-alkyl acrylate-carboxylic acid terpolymer, said rubbers vulcanized with a curing agent, and wherein the thermoplastic elastomer composition has a single low temperature brittle point.

2. A thermoplastic elastomer composition according to claim 1, wherein the amount of said polyamide is from about 25 to about 100 parts by weight per 100 parts by weight of said at least two acrylic rubbers, wherein said terpolymer has from about 35 to about 80 mole percent of ethylene, from about 10 to about 60 mole percent of acrylate, and from about 0.5 to about 10 mole percent of a carboxylic acid, and wherein at least one of said functionalized acrylic rubbers is derived from an alkyl acrylate wherein said alkyl group has from 1 to 10 carbon atoms.

3. A thermoplastic elastomer composition according to claim 2, wherein said functional group is a carboxyl, an epoxy, or a hydroxyl or ester, or combinations thereof, wherein the amount of said curing agent is from about 0.5 to about 12 parts by weight per 100 parts by weight of said at least two acrylic rubbers, and wherein said curing agent includes a nitrogen containing curing agent.

4. A thermoplastic elastomer composition according to claim 3, wherein the amount of said polyamide is from about 35 to about 75 parts by weight per 100 parts by weight of said at least two acrylic rubbers, wherein said alkyl group of said alkyl acrylate has from 1 to 3 carbon atoms, wherein said terpolymer has from about 45 to about 55 mole percent of ethylene, from about 37 to about 50 mole percent of acrylate, and from about 2 to about 8 mole percent of a carboxylic acid, and wherein the amount of said terpolymer is from about 40 parts to about 60 parts by weight per 100 parts by weight of said at least two acrylic rubbers.

5. A thermoplastic elastomer composition according to claim 4, wherein said thermoplastic elastomer composition has an oil swell value which is less than the oil swell value of said terpolymer.

6. A thermoplastic elastomer composition according to claim 2, wherein said single low temperature brittle point is minus 20° C. or below.

7. A thermoplastic elastomer composition according to claim 4, wherein said single low temperature brittle point is minus 40° C. or below, wherein said polyamide is NYLON 6, NYLON 11, NYLON 12, NYLON 6,6, NYLON 6,9, NYLON 6,10, and NYLON 6/6,6, or combinations thereof, and wherein said curing agent is an amine terminated polyether, or a diamine carbamate.

8. A process for forming a thermoplastic elastomer composition, comprising the steps of:

blending at least two functional group containing acrylic rubbers with a polyamide thermoplastic and a curing agent, at least one of said acrylic rubbers being an ethylene-alkyl acrylate-carboxylic acid terpolymer, and dynamically vulcanizing said acrylate rubbers and forming a thermoplastic elastomeric composition having a single low temperature brittle point.

9. A process according to claim 8, including forming said thermoplastic elastomer composition having a thermoplastic phase and a rubber phase, wherein the amount of said polyamide thermoplastic is from about 25 parts to about 100 parts by weight per 100 parts by weight of said at least two acrylic rubbers, wherein the amount of said terpolymer is from about 25 parts to about 75 parts by weight per 100 parts by weight of said at least two acrylic rubbers, wherein one of said acrylic rubbers is a functionalized alkyl acrylate wherein said alkyl portion has from 1 to 10 carbon atoms, and wherein said terpolymer has from about 35 to about 80 mole percent of ethylene, from about 10 to about 60 mole percent of acrylate, and from about 0.5 to about 10 mole percent of a carboxylic acid.

10. A process according to claim 9, wherein said single low temperature brittle point is minus 20° C. or below, and wherein the amount of said curing agent is from about 0.5 to about 12 parts by weight per 100 parts by weight of said at least two acrylic rubbers.

11. A process according to claim 10, including forming said thermoplastic elastomeric composition having an oil swell value which is at least 30 percent less than the oil swell value of said terpolymer.

12. A process according to claim 11, wherein said single low temperature brittle point is minus 40° C. or below, wherein said alkyl portion of said alkyl acrylate has from 1 to 3 carbon atoms, and wherein said functional group is a carboxyl, an epoxy, or a hydroxyl, or an ester, or combinations thereof.

13. A process according to claim 12, wherein the amount of said polyamide is from about 35 to about 75 parts by weight per 100 parts by weight of said at least two acrylic rubbers, wherein the amount of said terpolymer is from about 45 parts to about 55 parts by weight per 100 parts by weight of said at least two acrylic rubbers.

* * * * *